United States Patent
Palm

(10) Patent No.: US 8,838,292 B2
(45) Date of Patent: Sep. 16, 2014

(54) COLLISION AVOIDING METHOD AND ASSOCIATED SYSTEM

(75) Inventor: Kenneth Palm, Västra Frölunda (SE)

(73) Assignee: Kollmorgen Särö AB, Särö (SE)

( * ) Notice: Subject to any disclaimer, the term of this patent is extended or adjusted under 35 U.S.C. 154(b) by 0 days.

(21) Appl. No.: 13/985,569

(22) PCT Filed: Apr. 3, 2012

(86) PCT No.: PCT/EP2012/056105
§ 371 (c)(1),
(2), (4) Date: Aug. 14, 2013

(87) PCT Pub. No.: WO2012/136672
PCT Pub. Date: Oct. 11, 2012

(65) Prior Publication Data
US 2013/0325210 A1  Dec. 5, 2013

(30) Foreign Application Priority Data
Apr. 6, 2011 (EP) .................................. 11161263

(51) Int. Cl.
*G05D 1/00* (2006.01)
*G05D 1/02* (2006.01)
*G08G 1/16* (2006.01)

(52) U.S. Cl.
CPC .............. *G08G 1/164* (2013.01); *G05D 1/0289* (2013.01); *G05D 2201/0216* (2013.01)
USPC ........................................................... 701/2

(58) Field of Classification Search
CPC ..... G01S 13/93; G01S 13/931; G01S 5/0072; G01S 13/936; B60W 30/08; B60W 30/095; G08G 1/16; G08G 1/20; G05D 1/0289; G05D 2201/02; G05D 2201/0212; G05D 2201/0207; B60R 21/013
USPC ......... 701/2, 300–302, 23–26, 96; 340/425.5, 340/436
See application file for complete search history.

(56) References Cited

U.S. PATENT DOCUMENTS 6,012,003 A 1/2000 Astrom
6,405,132 B1 6/2002 Breed et al.
(Continued)

FOREIGN PATENT DOCUMENTS

EP 1898232 A1 3/2008
EP 2144217 A1 1/2010
(Continued)

OTHER PUBLICATIONS

Extended European Search Report for counterpart EP App. No. 11161263.6, dated Oct. 10, 2011.
(Continued)

*Primary Examiner* — Yonel Beaulieu
(74) *Attorney, Agent, or Firm* — Renner, Otto, Boisselle & Sklar, LLP

(57) ABSTRACT

A collisions avoiding method for avoiding collisions between vehicles (10; 12) moving in a predetermined area (14), wherein said vehicles may include unmanned vehicles (10) and manned vehicles (12). The method includes storing a map covering at least said predetermined area, said map including possible routes used by said vehicles (10;12). Vehicles moving in said predetermined area continuously transfer data relating to their present positions to a collision avoidance calculation module (20). Also included is continuously predicting specific paths of vehicles based on present positions and possible routes of said vehicles (10;12), preventing collisions between vehicles (10;12) by continuously comparing said predicted paths and possible routes to detect overlapping positions of different vehicles (10; 12) and forwarding interrupting commands to vehicles (10;12) heading to an overlapping position. The apparatus comprises a collision avoidance calculation module (20) and a processing unit (25), said processing unit (25) being arranged to continuously compare said predicted paths of each pair of the vehicles moving in said predetermined area (14) to detect overlapping positions.

7 Claims, 2 Drawing Sheets

(56) References Cited

U.S. PATENT DOCUMENTS

| | | | |
|---|---|---|---|
| 8,315,756 B2* | 11/2012 | Caveney | 701/23 |
| 2002/0165645 A1 | 11/2002 | Kageyama | |
| 2003/0225477 A1* | 12/2003 | Gilman et al. | 700/214 |
| 2004/0024527 A1* | 2/2004 | Patera | 701/301 |
| 2004/0254729 A1* | 12/2004 | Browne et al. | 701/301 |
| 2006/0106538 A1* | 5/2006 | Browne et al. | 701/301 |
| 2007/0043502 A1* | 2/2007 | Mudalige et al. | 701/207 |
| 2008/0269992 A1* | 10/2008 | Kawasaki | 701/45 |
| 2010/0076685 A1 | 3/2010 | Eidehall | |

FOREIGN PATENT DOCUMENTS

| | | |
|---|---|---|
| EP | 2289754 A1 | 3/2011 |
| WO | 2010143730 A1 | 12/2010 |

OTHER PUBLICATIONS

Broadhurst, A et al., "Monte Carlo Road Safety Reasoning," Presented at IEEE Intelligent Vehicles Symposium, 2005, Las Vegas, Nevada on Jun. 6, 2005.

International Search Report from Corresponding International Application No. PCT/EP2012/056105, Dated Jul. 16, 2012.

* cited by examiner

COLLISION AVOIDING METHOD AND ASSOCIATED SYSTEM

TECHNICAL FIELD

The invention relates to a method and a device for avoiding collisions between vehicles moving in a predetermined area. The area can be a worksite such as a factory or a warehouse and the vehicles can be unmanned (autonomous) or manned. The vehicles traverse in the worksite carrying goods and objects. Some unmanned or autonomous vehicles are referred to as Automated Guided Vehicles, AGVs.

PRIOR ART

Systems recently have been developed for improving safety for cars that are driven in public roads. These systems are provided with means for sensing speed and distance to adjacent vehicles.

A method and system for assessing vehicle paths in a road environment including a host vehicle and external objects is disclosed in US20100076685. The method includes: determining a position and a dynamic state of the host vehicle and of each of the external objects and generating a plurality of paths that may be followed by the vehicle as it moves toward the external objects. Each path is made up of path segments, including: an initial path segment corresponding to the vehicle continuing along a selected route without consideration of the external objects, and a maneuver pair for each external object, each maneuver pair including a path segment passing to the left of the external object and a path segment passing to the right of the external object.

A similar system is disclosed in EP2144217. According to the system an own vehicle risk acquiring ECU 1 acquires a predicted track of an own vehicle and calculates and acquires a plurality of tracks of the other vehicle about the own vehicle. According to the predicted track of the own vehicle and the plurality of tracks of the other vehicle, a collision probability of the own vehicle is calculated as a collision possibility. The system requires that an obstacle sensor is connected through an obstacle extracting section to the risk acquiring ECU 1, to which an own vehicle sensor is also connected.

A further similar system based on an on-board future conflict estimator is disclosed in EP1898232. The system also comprises a lateral feedback controller which generates a control signal a steering actuator of the vehicle.

In warehouses and similar buildings and worksites the speed of moving has increased while open spaces continuously are becoming smaller and smaller due to claims on higher efficiency. The areas used by manned and unmanned vehicles in a facility like a manufacturing plant or a distribution center always are as small as possible because floor space is a valuable asset. This makes it necessary to consider the actual area that the vehicle will occupy when traveling along the projected path.

Systems like the one described in US20100076685 and other prior art will not provide a desired safety and efficiency when unmanned vehicles and manned vehicles share the same area of travel in a worksite such as a factory or a warehouse. It is imperative that a system is capable of handling situations where there is no free line of sight between the vehicles involved. A vehicle can quickly and at high speed enter a crossing from a side aisle or turn a corner and create a collision hazard. This requires a solution that is not based on free line of sight. Collisions are more likely to occur when the speed of the vehicles is more and more increased. Therefore, it would be desirable to provide an improved system that will operate satisfactory in warehouses and similar worksites.

SUMMARY OF THE INVENTION

An object of the present invention is to provide a method and a device that will prevent or at least avoid collisions between vehicles moving in a predetermined area, wherein said vehicles may include unmanned and manned vehicles. Drawbacks of prior art systems have been overcome by a combination of features as set out below.

In accordance with the invention projected paths of transporting vehicles are determined. A sweep area related to the projected path is calculated for determining whether paths of two vehicles will overlap and cause a collision hazard. The current position of all vehicles, both unmanned and manned, is continuously updated. The position of unmanned vehicles normally is known since it is required to be able to drive automatically. A manned vehicle is provided with means, such as a navigation device, that continuously reports the location of the vehicle. When comparing projected paths and sweep areas of adjacent vehicles possible collision hazards can be detected and avoided.

Unmanned vehicles, such as automated guided vehicles AGVs, normally are instructed to follow planned or predetermined paths. An AGV is provided with means for determining the present position so as to be able to follow a path. Normally, the vehicle also is provided with means for wireless communication with a system controller unit for receiving path information and other data and instructions and for reporting the present position of the vehicle.

In accordance with the invention the automated guided vehicles continuously send position and path information to a centralised calculation module. The manned vehicles in a similar manner send position information to the centralised calculation module. The centralised calculation module also is given information about the area that is occupied by each vehicle, normally referred to as the sweep area. When collision risks and hazards are calculated by the centralised calculation module, a combination of position and path information and the sweep area is used. As a result a more complete overview can be determined by comparison with prior art techniques.

Layout information about the premises where the vehicles are moving is stored in a database. The information includes drive path areas and locations of all fixed installations and also structures close to the drive path areas such as storage racks, load/unload stations, machines, walls, etc. A drive path area is the area where vehicles, manned or unmanned, will travel. The exact drive path will be determined by the driver in the manned vehicle and by an AGV system controller for the unmanned vehicles.

The present positions of the vehicles that are reported to the centralised calculation module are periodically logged to the database. As a result events leading up an incident can be replayed and investigated. Also appropriate information regarding each incident is also stored in the database. Such information may comprise involved vehicles, their positions, directions and speed.

BRIEF DESCRIPTION OF THE DRAWINGS

In order that the manner in which the above recited and other advantages and objects of the invention are obtained will be readily understood, a more particular description of the invention briefly described above will be rendered by reference to specific embodiments thereof which are illustrated in the appended drawings.

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
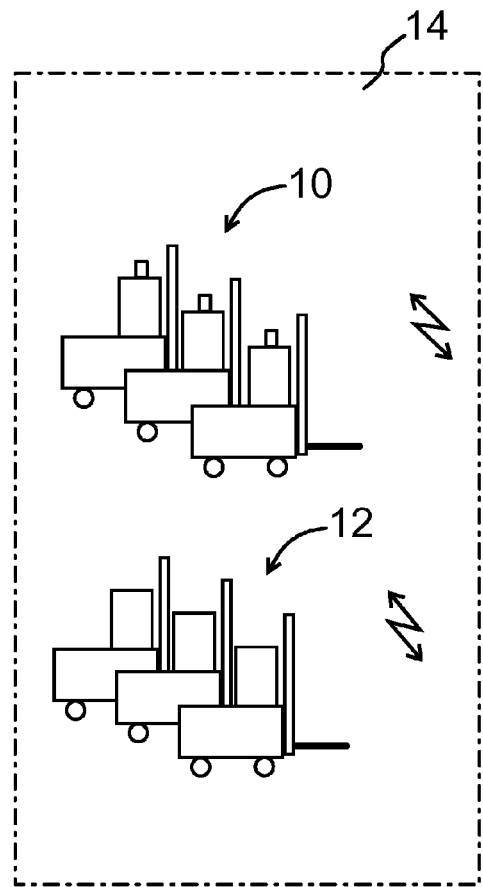
FIG. 1 shows schematically elements of a basic embodiment in accordance with the invention.
Figure 1:
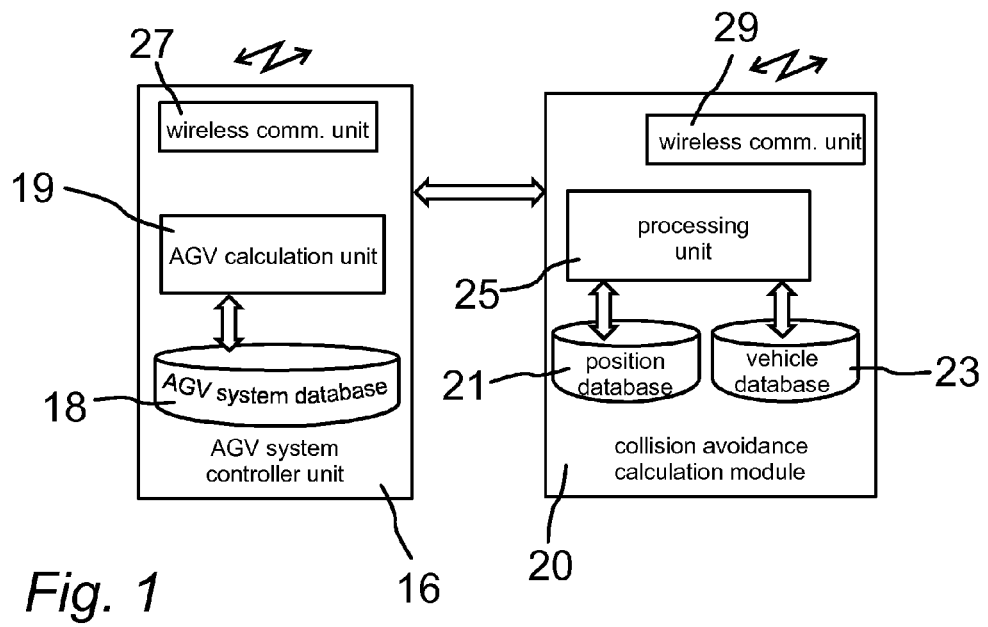

In the embodiment shown in FIG. 1 a plurality of automated guided vehicles (AGV) 10 and a plurality of manned vehicles 12 are transporting in premises 14, such as a warehouse or similar building or facility. The vehicles transporting in the premises are provided with position detectors so as to be able to detect their positions with an appropriate accuracy. Each vehicle also is provided with a wireless communication unit (not shown).

The AGVs 10 continuously communicate with an AGV system controller unit 16 through said wireless communication unit. Communication is bidirectional. The AGV system controller unit 16 comprises a map or a layout of the premises and of predetermined paths that the AGVs are directed to follow during transporting in the premises. The map also includes drive path areas and locations of all fixed installations and also structures close to the drive path areas such as storage racks, load/unload stations, machines, walls, etc. A drive path area is the area of the premises 14 that is open for vehicles, manned or unmanned, to travel. The layout can be stored in an AGV system database 18. Calculation of paths and controlling of AGVs for receiving and delivering articles and objects are tasks that belong to prior art and are handled in an AGV calculation unit 19.

Designing a layout for an AGV system is based on a map or a drawing of the facility. The drawing has to be very accurate, errors in distances preferably should be less than or around one centimeter. A CAD (Computer Aided Design) drawing provided by the facility user can be used, but normally is too inaccurate for direct use. Manual measurements may have to be done to improve the accuracy.

It is possible also to use a control system capable of collecting measurement bearings from a laser navigation scanner to a plurality of fixed reference objects, such as retro-reflective strips mounted as artificial landmarks throughout the facility. A method disclosed in U.S. Pat. No. 6,012,003 comprises detecting bearings from a measuring point on a vehicle to a fixed reference object at a predetermined time associated with movement of the vehicle in the facility. The bearings are stored along with the predetermined time associated therewith, and the position of the at least one fixed reference object together with the degree of uncertainty associated with the position from the bearings are continuously computed. The degree of uncertainty is reduced as the vehicle moves in the facility and the position of the fixed reference objects are accurately determined.

On the AGV 10 there is provided a plurality of sensors including a conventional laser navigation scanner, a conventional range finding sensor, odometry encoders on the wheels and in various embodiments a Global Positioning System (GPS) unit. It is possible also include a gyro system (not shown) on the vehicle to keep track of the present direction of the vehicle. Signals representing the position of the AGV are transferred to the AGV system controller unit 16.

In accordance with the invention the manned vehicles communicate with a collision avoidance calculation module 20 to give their present position as detected by the position detector. Position information is transferred at a rate that will ensure a detection of or predict possible collision situations before they actually occur. Position information relating to AGVs is transferred from the AGV system controller unit 16 to the collision avoidance calculation module 20. In various embodiments position information is transferred directly from AGVs to the collision avoidance calculation module 20. Data relating to a map over the premises, preferred routes of manned vehicles and predetermined paths used by the AGVs are stored in the collision avoidance calculation module 20.

A real time localisation of manned vehicles can be performed in a number of ways, examples are different types of RF localisation (RFID, UWB), vision based localisation using artificial landmarks or using natural landmarks found in the vicinity, laser navigation is of course also a possibility and GPS is a possibility especially for systems working outdoors. Signals representing the position of the manned vehicles are transferred to the collision avoidance calculation module 20.

It is important that the information about the position for the vehicles is transferred from the vehicle to the calculation module with very little latency in order for the calculation to work with information that is as current as possible. The most common way to transfer the information is as short messages using standard TCP/IP communication. A wireless local area network (WLAN) that covers the area where vehicles are travelling is then used to convey the information to the system where the calculation module 20 resides.

Position information relating to AGVs and manned vehicles presently transporting in the premises 14 is stored in a vehicle position database 21 in a common format in the collision avoidance calculation module 20. Information of each vehicle, such as physical size, speed limits, minimum turning radius and similar details also is stored in a vehicle database 23 the collision avoidance calculation module 20.

The information relating to the size and properties of each vehicle stored in the collision avoidance calculation module 20 is used together with path data to calculate the actual floor area that the path will cover. A processing unit 25 of the collision avoidance calculation module 20 continuously calculates the floor area. This floor area is defined as a sweep area.

The AGV system controller unit 16 is provided with a first wireless communication unit 27 and the collision avoidance calculation module 20 is provided with a second wireless communication unit 29. Both wireless communication units are arranged to communicate with corresponding wireless communication units in AGVs 10 and in manned vehicles 12. In various embodiments all wireless communication units operate under a common communication system, such as standard TCP/IP communication and a wireless local area network.

To be able to recount what happened when there is an incident, the position of vehicles are periodically logged to a database such as the vehicle position database 21. This allows a replay of the events leading up to the incident. Information on the incident itself is also stored to the database, like vehicles involved and their respective positions, directions, and speeds.

Figure 2:
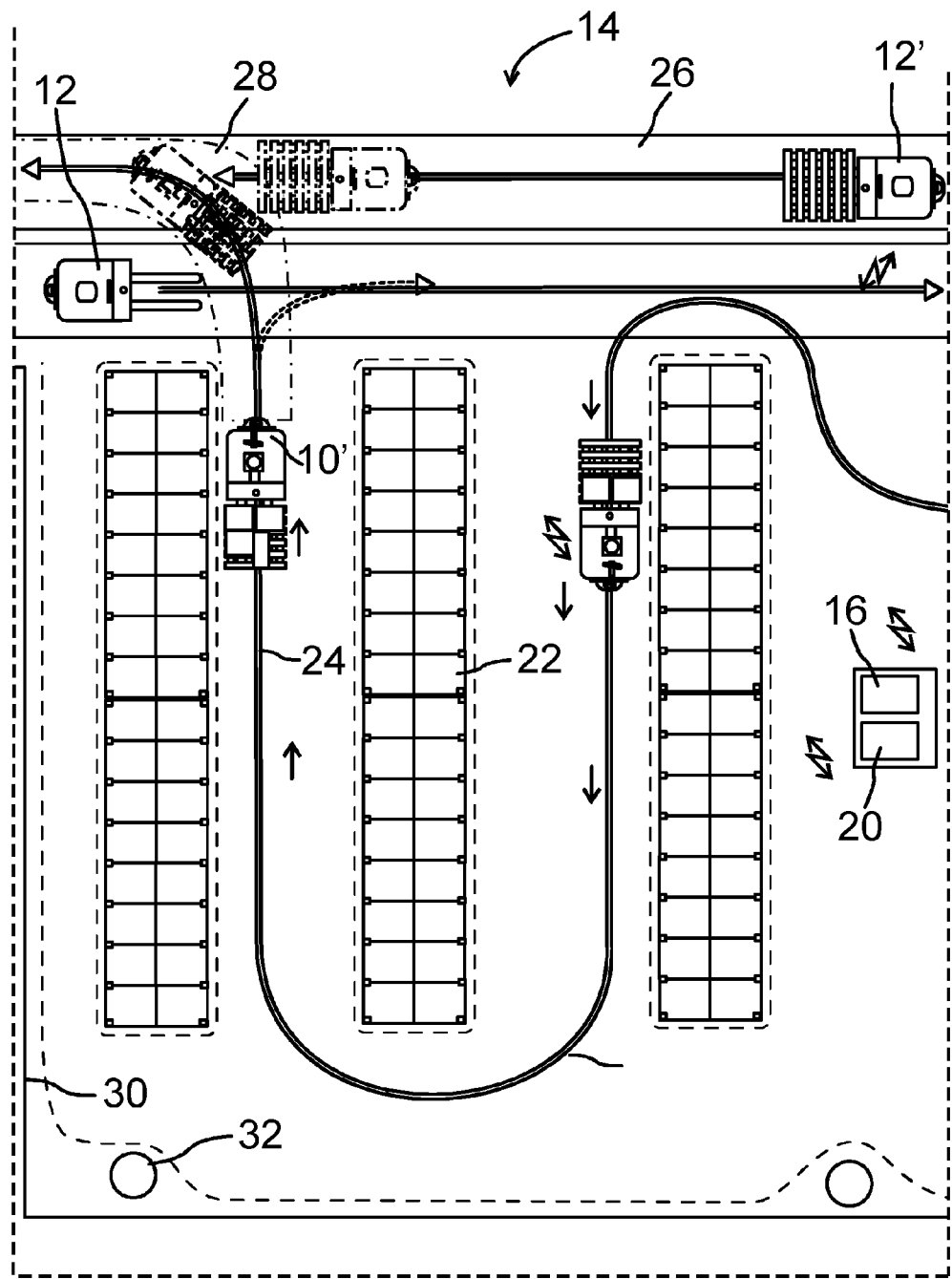
FIG. 2 is a schematic overview of premises where the invention is in operation.

The premises shown in FIG. 2 comprise a plurality of storage racks 22 arranged in parallel rows. A predetermined path 24 for AGVs extends along a side of the storage racks 22. The premises also comprise driving lanes 26 that can be used by any AGV and manned vehicles. The predetermined paths 24 are divided in segments that are connected together with points forming a network of drive paths. Segments can include straight lines of travel as well as different types of curves. Each path can of course be dynamically calculated and changed but is at least fixed during a suitable time. The area available for transporting is referred to as a drive path area. The full layout of the premises including said drive path areas and locations of all fixed installations and also structures close to the drive path areas such as storage racks, load/unload stations, machines, walls, etc. is stored in advance in the AGV system database 18, c.f. FIG. 1.

A full layout of the premises can be stored also in the collision avoidance calculation module 20. The information stored comprises drive path areas and the locations and sizes of all fixed installations and structures close to the drive path areas such as storage racks, load/unload stations, machines, walls 30 and pillars 32. This information is used to determine a drive path area. Drive path area is the area where vehicles, manned or unmanned, will travel. The exact drive path is up to the driver in the manned vehicle and to the AGV system for the unmanned vehicles.

The drive path for an AGV is divided in so called segments. Segments are connected using points to form a network of possible paths for the AGV to travel on between destinations. For each of these segments the floor space covered by the vehicle when traversing each segment can be calculated based on the envelope of the vehicle and the knowledge how the vehicle drives on a segment. This is called the sweep area of the segment.

A sweep area 28 of a segment is shown in FIG. 2. It illustrates that the actual area occupied be a vehicle, referred to as the sweep area, is larger than a measured physical size of the vehicle. A first AGV 10' has been collecting objects from storage racks 22 and is soon to cross and to enter a driving lane 26 following a predetermined path 24. The predetermined path is decided and controlled by the AGV system controller unit 16, cf. FIG. 1. A manned vehicle 12' is transporting on the driving lane 26. The AGV periodically reports the position to the AGV system controller. Using this information it is possible to free up the area behind the AGV as it moves along a drive path.

Future positions of the manned vehicle 12' at least in part are determined by the driver. Any uncertainties can be minimized and a probable path can be calculated. Traffic rules can be used to instruct the driver what to do in different traffic situations, for instance how to behave in crossing and when overtaking. Traffic rules are also used in combination with for instance painted lanes in the floor to indicate where to drive much like in the regular traffic on the roads.

The collision avoidance calculation module 20, cf. FIG. 1, takes traffic rules and the knowledge of where the lanes are into consideration when predicting the path for the manned vehicles. As a result it is possible to drastically reduce the uncertainty and to make it possible to take appropriate actions to avoid possible collisions.

The collision avoidance calculation module 20, cf. FIG. 1, continuously receives position data from both vehicles and is capable of calculating future positions of the vehicles based on previously stored information regarding the predetermined paths, driving lanes and normally applied traffic rules. Taking also the sweep area into consideration it is possible to detect in advance the situation outlined in FIG. 2 where the AGV 10' and the manned vehicle 12' are heading towards overlapping positions and therefore run the risk of colliding.

The possible actions that can be taken for the manned vehicles is different types of alerts for the driver, this can be light or sound. It is also a possibility to connect to the driving control system and stop or slow down the vehicle. This must however be done so that the driver is still in control of the vehicle as he or she is ultimately responsible.

For unmanned vehicles it is possible to fully control the vehicle and to either slow down or stop it. This is performed using the normal communication channel used to control the vehicle from the AGV system controller unit 16. By centralizing the calculation of collision hazard situations is it possible to select which vehicle in a possible collision situation that should take action in order to minimize the risk for a collision.

An appropriate action that can be taken is to send a slow down or finally a stop command to an AGV heading for collision position. Such a command can be generated in the collision avoidance calculation module 20 and forwarded to the AGV, either directly or through the AGV system controller unit 16. In various embodiments the collision avoidance calculation module 20 is arranged to generate and forward to the manned vehicle 12' a warning signal. When received at the manned vehicle a sound or light alert signal is generated to alert the driver of the manned vehicle of the upcoming situation.

Further improvements are possible by requesting the manned vehicles to inform the collision avoidance calculation module about the destination of each journey within the premises. By using the map of the premises where all paths and junctions are described it is possible to calculate the most probable path that the driver will select when driving from the current location to the destination. Using that information it is possible to predict which route the driver will take. This could even be enhanced with a "GPS like" turn by turn direction on how to drive.

While certain illustrative embodiments of the invention have been described in particularity, it will be understood that various other modifications will be readily apparent to those skilled in the art without departing from the scope and spirit of the invention. Accordingly, it is not intended that the scope of the claims appended hereto be limited to the description set forth herein but rather that the claims be construed as encompassing all equivalents of the present invention which are apparent to those skilled in the art to which the invention pertains.

The invention claimed is:

1. A collisions avoiding method for avoiding collisions between vehicles moving in a predetermined area, wherein said vehicles may include autonomous vehicles and manned vehicles, comprising:
   storing a map covering at least said predetermined area in a collision avoidance calculation module, said map including possible routes used by any of said autonomous vehicles and said manned vehicles and including preferred routes used by manned vehicles,
   continuously sending position information from said autonomous vehicles and said manned vehicles to said collision avoidance calculation module and updating a first set of data relating to present positions of said autonomous vehicles and said manned vehicles moving in said area,
   continuously predicting in said collision avoidance calculation module specific paths of said autonomous vehicles based on present positions and possible routes of said autonomous vehicles,
   storing and updating a second set of data relating to currently used paths for said autonomous vehicles when moving in at least said predetermined area,
   continuously predicting specific paths of manned vehicles based on present positions and preferred routes of said manned vehicles, and preventing collisions between said autonomous vehicles and said manned vehicles by continuously comparing said predicted paths with said currently used paths to detect overlapping positions and by forwarding interrupting commands from said collision avoidance calculation module to any of said autonomous vehicles and said manned vehicles heading to an overlapping position.

2. The collisions avoiding method as claimed in claim 1, also including the steps of storing locations and sizes of fixed installations and structures in said predetermined area.

3. The collisions avoiding method as claimed in claim 1, also including the steps of enabling receiving and storing information relating to destination of manned vehicles.

4. The collisions avoiding method as claimed in claim 1, also including the steps of storing a sweep area covered by at least said autonomous vehicles.

5. The collisions avoiding method as claimed in claim 1, also including the steps of sending a slow down or stop signal to an autonomous vehicle heading towards the overlapping position.

6. The collisions avoiding method as claimed in claim 1, also including the steps of storing in said map of said predetermined area preferred routes used by manned vehicles and continuously predicting specific paths of manned vehicles based on present positions and said preferred routes of said manned vehicles.

7. A collisions avoiding system for avoiding collisions between vehicles moving in a predetermined area, wherein said vehicles may include autonomous vehicles and manned vehicles, comprising a collision avoidance calculation module arranged to receive and store position data relating to the position of each of said autonomous vehicles and said manned vehicles transporting in said predetermined area, and a processing unit continuously calculating and predicting specific paths of said autonomous vehicles and said manned vehicles moving in said predetermined area based on present positions and possible routes of said autonomous vehicles and said manned vehicles, said processing unit being arranged to continuously compare said predicted paths of each pair of any of said autonomous vehicles and said manned vehicles moving in said predetermined area to detect overlapping positions and to forward interrupting commands to any of said autonomous vehicles and said manned vehicles heading to an overlapping position, said processing unit being arranged to continuously calculate and predict specific paths of manned vehicles based on present positions and preferred routes of said manned vehicles, and to continuously compare said predicted paths with currently used predetermined paths of autonomous vehicles to detect overlapping positions and to forward interrupting commands to any of said autonomous vehicles and said manned vehicles heading to an overlapping position.

* * * * *